(12) United States Patent
Sika

(10) Patent No.: US 10,901,836 B2
(45) Date of Patent: Jan. 26, 2021

(54) SYSTEMS AND METHODS FOR MITIGATING FAULTS IN COMBINATORY LOGIC

(71) Applicant: UNIVERSITY OF SOUTHERN CALIFORNIA, Los Angeles, CA (US)

(72) Inventor: Michel Sika, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 0 days.

(21) Appl. No.: 16/326,336

(22) PCT Filed: Sep. 15, 2017

(86) PCT No.: PCT/US2017/051903
§ 371 (c)(1),
(2) Date: Feb. 18, 2019

(87) PCT Pub. No.: WO2018/053346
PCT Pub. Date: Mar. 22, 2018

(65) Prior Publication Data
US 2019/0220347 A1 Jul. 18, 2019

Related U.S. Application Data

(60) Provisional application No. 62/395,992, filed on Sep. 16, 2016.

(51) Int. Cl.
*G06F 11/10* (2006.01)
*G06F 11/00* (2006.01)
(Continued)

(52) U.S. Cl.
CPC ............ *G06F 11/104* (2013.01); *G06F 11/00* (2013.01); *G06F 11/1024* (2013.01);
(Continued)

(58) Field of Classification Search
CPC ...... G06F 11/104; G06F 30/327; G06F 11/00; G06F 11/1024; G06F 2117/02;
(Continued)

(56) References Cited

U.S. PATENT DOCUMENTS 4,924,467 A 5/1990 Criswell
7,036,059 B1 4/2006 Carmichael et al.
(Continued)

OTHER PUBLICATIONS

C. Chang, A. S. Molahosseini, A. A. E. Zarandi and T. F. Tay, "Residue Number Systems: A New Paradigm to Datapath Optimization for Low-Power and High-Performance Digital Signal Processing Applications," in IEEE Circuits and Systems Magazine, vol. 15, No. 4, pp. 26-44, Fourthquarter 2015. (Year: 2015).*
(Continued)

*Primary Examiner* — Cynthia Britt
(74) *Attorney, Agent, or Firm* — Snell & Wilmer LLP

(57) ABSTRACT

Methods, systems, and apparatus for detecting single event effects. The system includes a first-modulus digital logic unit and a second-modulus digital logic unit each configured to reduce one or more operands by a respective modulus, apply an arithmetic compute logic to the reduced operands to produce a respective compute output, and reduce the respective compute output by their respective modulus. The system includes a kernel digital logic unit configured to apply the arithmetic compute logic to the operands to produce a kernel compute output, output the kernel compute output reduced by the first modulus, and output the kernel compute output reduced by the second modulus. The system includes a detector configured to detect a single event effect based on the reduced first compute output, the kernel compute output reduced by the first modulus, the reduced second compute output, and the kernel compute output reduced by the second modulus.

20 Claims, 21 Drawing Sheets

(51) Int. Cl.
  *G06F 30/327* (2020.01)
  *H03K 19/007* (2006.01)
  *G06F 117/02* (2020.01)

(52) U.S. Cl.
  CPC ....... *G06F 30/327* (2020.01); *H03K 19/0075* (2013.01); *G06F 2117/02* (2020.01)

(58) Field of Classification Search
  CPC .. G06F 11/18; G06F 11/0793; G06F 11/1641; G06F 11/1629; G06F 11/1608; H03K 19/0075
  See application file for complete search history.

(56) References Cited

U.S. PATENT DOCUMENTS

| | | | | |
|---|---|---|---|---|
| 7,200,822 | B1* | 4/2007 | McElvain | G06F 30/327 716/101 |
| 7,260,742 | B2 | 8/2007 | Czajkowski | |
| 7,337,356 | B2* | 2/2008 | Mudge | G06F 9/3861 714/10 |
| 7,555,692 | B1* | 6/2009 | Iacobovici | G06F 9/3001 708/233 |
| 8,489,919 | B2 | 7/2013 | Clark et al. | |
| 8,965,943 | B2* | 2/2015 | Mellott | H03M 7/18 708/491 |
| 2009/0319253 | A1* | 12/2009 | Phillips | G06F 30/34 703/16 |
| 2014/0188965 | A1* | 7/2014 | Iacobovici | G06F 7/72 708/491 |
| 2018/0026658 | A1* | 1/2018 | Park | H03M 13/1171 365/174 |

OTHER PUBLICATIONS

International Search Report and Written Opinion of the International Searching Authority (dated Dec. 4, 2017) for Corresponding International PCT Patent Application No. PCT/US17/51903, filed Sep. 15, 2017.

Sika, M.D., et al. "Applying Residue Arithmetic Codes to Combinational Logic to Reduce Single Event Upsets." [online] published Apr. 16, 2014, [retrieved on Nov. 13, 2017 {Nov. 13, 2017)] Retrieved from the internetURL:https://www.cc.gatech.edu/-ayazdanb/publication/papers/residue-radecs_13.pdf {p. 1, col. 1 and col. 2; p. 2, col. 1 and col. 2; p. 3, col. 1; p. 4, col. 2; Fig. 1, Fig. 2).

Bolchini et al. "TMR and Partial Dynamic Reconfiguration to mitigate SEU faults in FPGAs." [online] Defect and Fault-Tolerance in VLSI Systems, 2007, DFT'07. $22^{nd}$ IEEE International Symnposium on. IEEE, 2007. [retrieved on Nov. 13, 2017 (Nov. 13, 2017)] Retrieved from the Internet,URL: https://pdfs.semanticscholar.org/f6f4/Badba7b71a93cb4b1d591f051a6c9dd37c5e.pdf> entire document.

Sika, Michel D., et al. "Low Energy Hardening of Combinatorial Logic using Standard Cells and Residue Codes." [online] published Apr. 16, 2014. [retrieved on Nov. 13, 2017 (Nov. 13, 2017)] Retrieved from the InternetURL:https://www.cc.gatech.edu/~ayazdanb/publication/papers/residue-gomactech14.pdf entire document.

* cited by examiner

| SCENARIO 1: | NO SEE STRIKE, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x0 |

| SCENARIO 2: | SEE STRIKE RES CODE GEN BLOCK A, 2-OPERAND 4-BIT ADDER, MOD: {m=7, n=15} |
|---|---|
| Operand A | xD |
| Operand B | xA |
| A%m | x7 |
| B%m | x3 |
| (A%m+B%m) %m | x3 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |

| SCENARIO 3: | SEE STRIKE ARITH. COMPUTE. LOG. BLOCK A, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x0 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |

| SCENARIO 4: | SEE STRIKE RES CODE GEN BLOCK A OUTPUT, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x3 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |

FIG. 2A

| SCENARIO 5: | SEE STRIKE RES CODE GEN BLOCK B, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xB |
| (A%n+B%n) %n | x6 |
| A+B | x17 |
| (A+B) %m | x2 |
| (A+B) %n | x2 |
| SEE DETECT. FLAGS | x1 |

| SCENARIO 6: | SEE STRIKE ARITH. COMPUTE. LOG. BLOCK B, 2-OPERAND 4-BIT ADDER MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x12 |
| A+B | x17 |
| (A+B) %m | x2 |
| (A+B) %n | x2 |
| SEE DETECT. FLAGS | x1 |

| SCENARIO 7: | SEE STRIKE RES CODE GEN BLOCK B OUTPUT, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x1 |
| A+B | x17 |
| (A+B) %m | x2 |
| (A+B) %n | x2 |
| SEE DETECT. FLAGS | x1 |

| SCENARIO 8: | SEE STRIKE COMPUTE KERNEL, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x1F |
| (A+B) %m | x3 |
| (A+B) %n | xA |
| SEE DETECT. FLAGS | x3 |

FIG. 2B

| SCENARIO 9: | SEE STRIKE RES CODE GEN<br>m BLOCK C, 2-OPERAND 4-<br>BIT ADDER, MOD:<br>{m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x6 |
| (A+B) %n | x2 |
| SEE DETECT. FLAGS | x2 |

| SCENARIO 10: | SEE STRIKE RES CODE GEN<br>n BLOCK C, 2-OPERAND 4-<br>BIT ADDER, MOD:<br>{m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x3 |
| SEE DETECT. FLAGS | x1 |

| SCENARIO 11: | SEE STRIKE COMPARATOR<br>BLOCK A, 2-OPERAND 4-<br>BIT ADDER, MOD:<br>{m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |

| SCENARIO 12: | SEE STRIKE COMPARATOR<br>BLOCK B, 2-OPERAND 4-<br>BIT ADDER, MOD:<br>{m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x1 |

TABLE 1

FIG. 2C

| SCENARIO 1: | NO SEE STRIKE, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x0 |
| CORRECTED OUTPUT | x17 |

| SCENARIO 2: | SEE STRIKE RES CODE GEN BLOCK A, 2-OPERAND 4-BIT ADDER, MOD: {m=7, n=15} |
|---|---|
| Operand A | xD |
| Operand B | xA |
| A%m | x7 |
| B%m | x3 |
| (A%m+B%m) %m | x3 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |
| CORRECTED OUTPUT | x17 |

| SCENARIO 3: | SEE STRIKE ARITH. COMPUTE. LOG. BLOCK A, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x0 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |
| CORRECTED OUTPUT | x17 |

| SCENARIO 4: | SEE STRIKE RES CODE GEN BLOCK A OUTPUT, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x3 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |
| CORRECTED OUTPUT | x17 |

FIG. 4A

| SCENARIO 5: | SEE STRIKE RES CODE GEN BLOCK B, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xB |
| (A%n+B%n) %n | x6 |
| A+B | x17 |
| (A+B) %m | x2 |
| (A+B) %n | x2 |
| SEE DETECT. FLAGS | x1 |
| CORRECTED OUTPUT | x17 |

| SCENARIO 6: | SEE STRIKE ARITH. COMPUTE. LOG. BLOCK B, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x12 |
| A+B | x17 |
| (A+B) %m | x2 |
| (A+B) %n | x2 |
| SEE DETECT. FLAGS | x1 |
| CORRECTED OUTPUT | x17 |

| SCENARIO 7: | SEE STRIKE RES CODE GEN BLOCK B OUTPUT, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x1 |
| A+B | x17 |
| (A+B) %m | x2 |
| (A+B) %n | x2 |
| SEE DETECT. FLAGS | x1 |
| CORRECTED OUTPUT | x17 |

| SCENARIO 8: | SEE STRIKE COMPUTE KERNEL, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x1F |
| (A+B) %m | x3 |
| (A+B) %n | xA |
| SEE DETECT. FLAGS | x3 |
| CORRECTED OUTPUT | x17 |

FIG. 4B

| SCENARIO 9: | SEE STRIKE RES CODE GEN m BLOCK C, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x6 |
| (A+B) %n | x2 |
| SEE DETECT. FLAGS | x2 |
| CORRECTED OUTPUT | x17 |

| SCENARIO 10: | SEE STRIKE RES CODE GEN n BLOCK C, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x3 |
| SEE DETECT. FLAGS | x1 |
| CORRECTED OUTPUT | x17 |

| SCENARIO 11: | SEE STRIKE COMPARATOR BLOCK A, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x2 |
| CORRECTED OUTPUT | x17 |

| SCENARIO 12: | SEE STRIKE COMPARATOR BLOCK B, 2-OPERAND 4-BIT ADDER, MOD: {m=7, n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x1 |
| CORRECTED OUTPUT | x17 |

FIG. 4C

| SCENARIO 13: | SEE STRIKE FAULT POS. IND. m, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x0 |
| CORRECTED OUTPUT | x17 |

| SCENARIO 14: | SEE STRIKE FAULT POS. IND. n, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x0 |
| CORRECTED OUTPUT | x17 |

| SCENARIO 15: | SEE STRIKE DIFFERENTIATOR, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x0 |
| CORRECTED OUTPUT | x17 |

| SCENARIO 16: | SEE STRIKE BIT INVERTER, 2-OPERAND 4-BIT ADDER, MOD: {m=7 ,n=15} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A+B | x17 |
| (A+B) %m | x2 |
| (A+B) %n | x2 |
| SEE DETECT. FLAGS | x0 |
| CORRECTED OUTPUT | x17 |

FIG. 4D

| SCENARIO 1: | NO SEE STRIKE, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

| SCENARIO 2: | SEE STRIKE RES CODE GEN BLOCK A, 2-OPERAND 4-BIT ADDER, MOD: {m=7, n=15, p=9} |
|---|---|
| Operand A | xD |
| Operand B | xA |
| A%m | x7 |
| B%m | x3 |
| (A%m+B%m) %m | x3 |
| A%n | xD |
| B%n | xA |
| (A%n+B%n) %n | x2 |
| A%p | x4 |
| B%p | x1 |
| (A%p+B%p)%p | x5 |
| A+B | x17 |
| (A+B) %m | x2 |
| (A+B) %n | x2 |
| (A+B) %p | x5 |
| SEE DETECT. FLAGS | x4 |
| CORRECTED OUTPUT | x17 |

FIG. 6A

| SCENARIO 3: | SEE STRIKE ARITH. COMPUTE. LOG. BLOCK. A, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x0 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x4 |
| CORRECTED OUTPUT | x17 |

| SCENARIO 4: | SEE STRIKE RES CODE GEN BLOCK A OUTPUT, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x3 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x4 |
| CORRECTED OUTPUT | x17 |

| SCENARIO 5: | SEE STRIKE RES CODE GEN BLOCK B, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xB |
| (A%n+B%n) %n | x6 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x2 |
| CORRECTED OUTPUT | x17 |

| SCENARIO 6: | SEE STRIKE ARITH. COMPUTE. LOG. BLOCK. B, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x12 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x2 |
| CORRECTED OUTPUT | x17 |

FIG. 6B

| SCENARIO 7: | SEE STRIKE RES CODE GEN BLOCK B OUTPUT, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x1 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x2 |
| CORRECTED OUTPUT | x17 |

| SCENARIO 8: | SEE STRIKE RES CODE GEN BLOCK C, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x9 |
| (A%p+B%p) %p | x4 |
| A+B | x17 |
| (A+B) %m | x2 |
| (A+B) %n | x2 |
| (A+B) %p | x5 |
| SEE DETECT. FLAGS | x1 |
| CORRECTED OUTPUT | x17 |

| SCENARIO 9: | SEE STRIKE ARITH. COMPUTE. LOG. BLOCK. C, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x7 |
| A+B | x17 |
| (A+B) %m | x2 |
| (A+B) %n | x2 |
| (A+B) %p | x5 |
| SEE DETECT. FLAGS | x1 |
| CORRECTED OUTPUT | x17 |

| SCENARIO 10: | SEE STRIKE RES CODE GEN BLOCK C OUTPUT, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | xD |
| A+B | x17 |
| (A+B) %m | x2 |
| (A+B) %n | x2 |
| (A+B) %p | x5 |
| SEE DETECT. FLAGS | x1 |
| CORRECTED OUTPUT | x17 |

FIG. 6C

| SCENARIO 11: | SEE STRIKE COMPUTE KERNEL, 2-OPERAND 4-BIT ADDER, MOD: {m=7 ,n=15 ,P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x15 |
| (A+B) %m | x0 |
| (A+B) %n | x0 |
| (A+B) %p | x3 |
| SEE DETECT. FLAGS | x7 |
| CORRECTED OUTPUT | x17 |

| SCENARIO 12: | SEE STRIKE RES CODE GEN m BLOCK D, 2-OPERAND 4-BIT ADDER, MOD: {m=7 ,n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x6 |
| (A+B) %n | x2 |
| (A+B) %p | x5 |
| SEE DETECT. FLAGS | x4 |
| CORRECTED OUTPUT | x17 |

| SCENARIO 13: | SEE STRIKE RES CODE GEN n BLOCK D, 2-OPERAND 4-BIT ADDER, MOD: {m=7 ,n=15 ,p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x6 |
| (A+B) %p | x5 |
| SEE DETECT. FLAGS | x2 |
| CORRECTED OUTPUT | x17 |

| SCENARIO 14: | SEE STRIKE RES CODE GEN p BLOCK D, 2-OPERAND 4-BIT ADDER, MOD: {m=7 ,n=15 ,p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x7 |
| SEE DETECT. FLAGS | x1 |
| CORRECTED OUTPUT | x17 |

FIG. 6D

| SCENARIO 15: | SEE STRIKE COMPARATOR BLOCK A, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x4 |
| CORRECTED OUTPUT | x17 |

| SCENARIO 16: | SEE STRIKE COMPARATOR BLOCK B, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x2 |
| CORRECTED OUTPUT | x17 |

| SCENARIO 17: | SEE STRIKE COMPARATOR BLOCK C, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x1 |
| CORRECTED OUTPUT | x17 |

| SCENARIO 18: | SEE STRIKE FAULT POS. IND. m, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

FIG. 6E

| SCENARIO 19: | SEE STRIKE FAULT POS. IND. n, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

| SCENARIO 20: | SEE STRIKE FAULT POS. IND. p, 2-OPERAND 4-BIT ADDER, MOD: {m=7, n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

| SCENARIO 21: | SEE STRIKE DIFFERENTIATOR, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

| SCENARIO 22: | SEE STRIKE BIT INVERTER, 2-OPERAND 4-BIT ADDER, MOD: {m=7, n=15, p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

FIG. 6F

| SCENARIO 23: | 2-UPSET STRIKE COMPUTE KERNEL, 2-OPERAND 4-BIT ADDER, MOD: {m=7 ,n=15 ,p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%n | xD |
| B%n | xA |
| (A%n+B%n) %n | x2 |
| A%p | x4 |
| B%p | x1 |
| (A%p+B%p) %p | x5 |
| A+B | x1B |
| (A+B) %m | x1 |
| (A+B) %n | x8 |
| (A+B) %p | x2 |
| SEE DETECT. FLAGS | x7 |
| CORRECTED OUTPUT | x17 |

| SCENARIO 24: | SEE STRIKE BIT INVERTER & DIFFERENTIATOR, 2 OPERAND 4-BIT ADDER, MOD: {m=7 ,n=15, P=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x17 |
| (A+B) %m | x2 |
| (A+B) %n | x2 |
| (A+B) %p | x5 |
| SEE DETECT. FLAGS | x0 |
| CORRECTED OUTPUT | x17 |

| SCENARIO 25: | SEE STRIKE COMPUTE KERNEL & RES CODE GEN n, 2-OPERAND 4-BIT ADDER, MOD: {m=7 ,n=15 ,p=9} |
|---|---|
| Operand A | xD |
| Operand B | xA |
| A%m | x6 |
| B%m | x3 |
| (A%m+B%m) %m | x2 |
| A%n | xD |
| B%n | xA |
| (A%n+B%n) %n | x2 |
| A%p | x4 |
| B%p | x1 |
| (A%p+B%p) %p | x5 |
| A+B | x13 |
| (A+B) %m | x5 |
| (A+B) %n | x12 |
| (A+B) %p | x9 |
| SEE DETECT. FLAGS | x7 |
| CORRECTED OUTPUT | x17 |

FIG. 6G

| SCENARIO 1: | NO SEE STRIKE, 2-OPERAND 4-BIT ADDER, MOD 7 |
|---|---|
| Operand A | xD |
| Operand B | xA |
| A%7 | x6 |
| B%7 | x3 |
| A+B | x17 |
| (A%7+B%7) %7 | x2 |
| (A+B) %7 | x2 |
| SEE DETECT. FLAG | x0 |

| SCENARIO 2: | SEE STRIKE IN ARITH. COMPUTE LOGIC BLOCK A, 2-OPERAND 4-BIT ADDER, MOD 7 |
|---|---|
| Operand A | xD |
| Operand B | xA |
| A%7 | x6 |
| B%7 | x3 |
| A+B | x1F |
| (A%7+B%7) %7 | x2 |
| (A+B) %7 | x3 |
| SEE DETECT. FLAG | 1 |

| SCENARIO 3: | SEE STRIKE IN RES. CODE GEN. BLOCK A, 2-OPERAND 4-BIT ADDER, MOD 7 |
|---|---|
| Operand A | xD |
| Operand B | xA |
| A%7 | x6 |
| B%7 | x3 |
| A+B | x17 |
| (A%7+B%7) %7 | x2 |
| (A+B) %7 | x6 |
| SEE DETECT. FLAG | x1 |

| SCENARIO 4: | SEE STRIKE IN RES. CODE GEN. OPERAND A, 2-OPERAND 4-BIT ADDER, MOD 7 |
|---|---|
| Operand A | xD |
| Operand B | xA |
| A%7 | x4 |
| B%7 | x3 |
| A+B | x17 |
| (A%7+B%7) %7 | x0 |
| (A+B) %7 | x2 |
| SEE DETECT. FLAG | 1 |

FIG. 8A

| SCENARIO 5: | SEE STIKE IN RES. CODE GEN. OPERAND B, 2-OPERAND 4-BIT ADDER, MOD 7 |
|---|---|
| Operand A | xD |
| Operand B | xA |
| A%7 | x6 |
| B%7 | x2 |
| A+B | 17 |
| (A%7+B%7) %7 | x1 |
| (A+B) %7 | x2 |
| SEE DETECT. FLAG | 1 |

| SCENARIO 6: | SEE STRIKE IN ARITH. COMPUTE LOGIC BLOCK B, 2-OPERAND 4-BIT ADDER, MOD 7 |
|---|---|
| Operand A | xD |
| Operand B | xA |
| A%7 | x6 |
| B%7 | x3 |
| A+B | x17 |
| (A%7+B%7) %7 | x3 |
| (A+B) %7 | x2 |
| SEE DETECT. FLAG | 1 |

| SCENARIO 7: | SEE STRIKE IN RES. CODE GEN. BLOCK B OUTPUT, 2-OPERAND 4-BIT ADDER, MOD 7 |
|---|---|
| Operand A | xD |
| Operand B | xA |
| A%7 | x6 |
| B%7 | x3 |
| A+B | x17 |
| (A%7+B%7) %7 | x6 |
| (A+B) %7 | x2 |
| SEE DETECT. FLAG | 1 |

| SCENARIO 8: | SEE STRIKE IN COMPARATOR, 2-OPERAND 4-BIT ADDER, MOD 7 |
|---|---|
| Operand A | xD |
| Operand B | xA |
| A%7 | x6 |
| B%7 | x3 |
| A+B | x17 |
| (A%7+B%7) %7 | x2 |
| (A+B) %7 | x2 |
| SEE DETECT. FLAG | 1 |

FIG. 8B

SYSTEMS AND METHODS FOR MITIGATING FAULTS IN COMBINATORY LOGIC

CROSS REFERENCE TO RELATED APPLICATIONS

This application claims the benefit and priority of U.S. Provisional Application Ser. No. 62/395,992, filed Sep. 16, 2016, entitled "Systems and Methods for Mitigating Faults in Combinatory Logic," the contents of which are herein incorporated by reference in its entirety.

GOVERNMENT LICENSE RIGHTS

This invention was made with United States government support under Contract No. DTRA01-14-C-0126 awarded by the Defense Threat Reduction Agency. The United States government has certain rights in this invention.

BACKGROUND

1. Field

This specification relates to a set of systems and a method for detecting the occurrence of single event effects or for detecting and correcting the occurrence of single event effects that result in single event upsets in digital combinatorial logic.

2. Description of the Related Art

Modern semiconductors leverage technology scaling and new structures in order to improve the performance and efficiency of modern microelectronics. However, the semiconductor properties that have enabled these benefits have also, in many cases, rendered transistors more susceptible to the effects of charged particles such as those that result from cosmic rays emanating from the Sun. The Sun emanates particles which, upon impact with the atmosphere, can deposit pockets of energy in most microelectronics. These pockets of energy can cause temporary or permanent faults. This deposited energy can result in faults through a change in biasing of one or more transistors resulting in one or more bit flips. These bit flips can potentially lead to errors. While these faults are spurious, they may still be registered as errors during processing performed by microelectronics. For non-critical application, restarting a portion or an entire computation may be an adequate approach. This can be accomplished when an error is suspected or as part of routine maintenance of an application. These techniques include memory checks and check-point restart method. For critical applications that require real-time accuracy, other approaches typically based on a combination of redundancy and transient suppression are employed. These techniques, while effective, result in significant overhead, as performance and efficiency penalties for the applicable microelectronics and overall systems.

In combinatorial logic, the error cross section of a circuit increases proportionately to the increase in Single Event Transient (SET) width. As technology nodes reduce in scale, the effects of SETs result in an increased occurrence of Single Event Upsets (SEU). While Block-code based error detection and correction techniques and circuit-centric radiation hardening methods are effective to mitigate SEUs in memory elements, a reliable and low overhead SEU mitigation technique for combinatorial logic has remained elusive.

Mitigating single event upsets (SEU) in combinatorial logic is conventionally accomplished through redundancy based Radiation Hardening By Design (RHBD) methods. However, these systems and methods have significant overhead in terms of area requirements, energy requirements, and speed restrictions.

SUMMARY

What is described is a system for detecting the occurrence of single event effects that result in single event upsets in digital combinatorial logic. The system includes a data input configured to provide one or more operands. The system also includes a first-modulus digital logic unit connected to the data input. The first-modulus digital logic unit is configured to reduce each of the one or more operands by a first modulus, apply arithmetic compute logic to the reduced one or more operands to produce a first compute output, and reduce the first compute output by the first modulus. The system also includes a second-modulus digital logic unit connected to the data input. The second-modulus digital logic unit is configured to reduce each of the one or more operands by a second modulus, apply the arithmetic compute logic to the reduced one or more operands to produce a second compute output, and reduce the second compute output by the second modulus. The system also includes a kernel digital logic unit connected to the data input. The kernel digital logic unit is configured to apply the arithmetic compute logic to the one or more operands to produce a kernel compute output, output the kernel compute output reduced by the first modulus, and output the kernel compute output reduced by the second modulus. The system also includes a detector connected to the first-modulus digital logic unit, the second-modulus digital logic unit, and the kernel digital logic unit. The detector is configured to receive, from the first-modulus digital logic unit, the reduced first compute output, receive, from the second-modulus digital logic unit, the reduced second compute output, receive, from the kernel digital logic unit, the kernel compute output reduced by the first modulus and the kernel compute output reduced by second first modulus, and detect a single event effect based on a comparison of the reduced first compute output and the kernel compute output reduced by the first modulus, and a comparison of the reduced second compute output and the kernel compute output reduced by the second modulus.

An apparatus for detecting single event effects is disclosed. The apparatus includes a data input configured to provide one or more operands. The apparatus also includes a first-modulus digital logic unit connected to the data input. The first-modulus digital logic unit is configured to reduce each of the one or more operands by a first modulus, apply an arithmetic compute logic to the reduced one or more operands to produce a first compute output, and reduce the first compute output by the first modulus. The apparatus also includes a second-modulus digital logic unit connected to the data input. The second-modulus digital logic unit is configured to reduce each of the one or more operands by a second modulus, apply the arithmetic compute logic to the reduced one or more operands to produce a second compute output, and reduce the second compute output by the second modulus. The apparatus also includes a kernel digital logic unit connected to the data input. The kernel digital logic unit is configured to apply the arithmetic compute logic to the one or more operands to produce a kernel compute output, output the kernel compute output reduced by the first modulus, and output the kernel compute output reduced by the second modulus. The apparatus also includes a detector connected to the first-modulus digital logic unit, the second-modulus digital logic unit, and the kernel digital logic unit. The detector is configured to receive, from the first-modulus digital logic unit, the reduced first compute output, receive, from the second-modulus digital logic unit, the reduced second compute output, receive, from the kernel digital logic unit, the kernel compute output reduced by the first modulus and the kernel compute output reduced by second first modulus, and detect a single event effect based on a comparison of the reduced first compute output and the kernel compute output reduced by the first modulus, and a comparison of the reduced second compute output and the kernel compute output reduced by the second modulus.

A system for characterizing radiation susceptibility is disclosed. The system includes a plurality of semiconductor devices. The system also includes a plurality of sensors distributed across and embedded in each of the plurality of semiconductor devices. Each sensor of the plurality of sensors includes a modulus digital logic unit. The modulus digital unit includes a set of modulus input residue code generators configured to receive one or more operands from a data input, and reduce the one or more operands by a modulus, a first compute kernel configured to receive the one or more operands reduced by the modulus from the set of modulus input residue code generators, and apply the arithmetic compute logic to the received reduced one or more operands to produce the first compute output, and an output residue code generator configured to receive the first compute output from the first compute kernel, and reduce the first compute output by the modulus. Each sensor of the plurality of sensors includes a kernel digital logic unit. The kernel digital logic unit includes a second compute kernel configured to receive the one or more operands from the data input, and apply the arithmetic compute logic to the received one or more operands to produce the kernel compute output, a kernel-unit modulus output residue code generator configured to receive the kernel compute output, and reduce the kernel compute output by the modulus. Each sensor of the plurality of sensors includes a detector connected to the modulus digital logic unit and the kernel digital logic unit. The detector is configured to receive, from the modulus digital logic unit, the reduced first compute output, receive, from the kernel digital logic unit, the reduced kernel compute output, and detect a single event effect based on a comparison of the reduced first compute output and the reduced kernel compute output.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 2A-2C illustrate tables of exemplary scenarios using the system shown in FIG. 1, according to various embodiments of the invention.

FIGS. 4A-4D illustrate tables of exemplary scenarios using the system shown in FIG. 3, according to various embodiments of the invention.

FIGS. 6A-6G illustrate tables of exemplary scenarios using the system shown in FIG. 5, according to various embodiments of the invention.

FIGS. 8A-8B illustrate tables of exemplary scenarios using the system shown in FIG. 7, according to various embodiments of the invention.

DETAILED DESCRIPTION

Disclosed herein are systems, vehicles, and methods for detecting Single Event Effects (SEEs). Conventionally, redundancy was used to address situations where Single Event Effects result in errors. However, using redundancy also results in increased overhead in terms of size, energy, and speed, sometimes by a factor of 3.5× to 7×. The systems described herein achieve the same results with approximately ⅓ of the area used, ⅓ of the energy used, and 3 times the speed of redundant systems. In addition, redundant systems are not capable of determining which data is affected.

The systems described herein also have a flexible design, which can be customized based on the number of bits needed to be corrected. This is achieved by using cascaded detectors where one computation block feeds another computation block, to detect multiple faults. The flexible designs are illustrated in the various structures illustrated in FIGS. 1-4.

The systems described herein demonstrate that residue codes applied to arithmetic blocks or residue-arithmetic coding (RAC) are an effective means to harden the arithmetic logic processing components of a system from SEUs without the high area, speed, power requirements of triple modular redundancy. Importantly, the systems and approaches described herein are independent of the semiconductor technology with which the systems and approaches are implemented.

Figure 1:
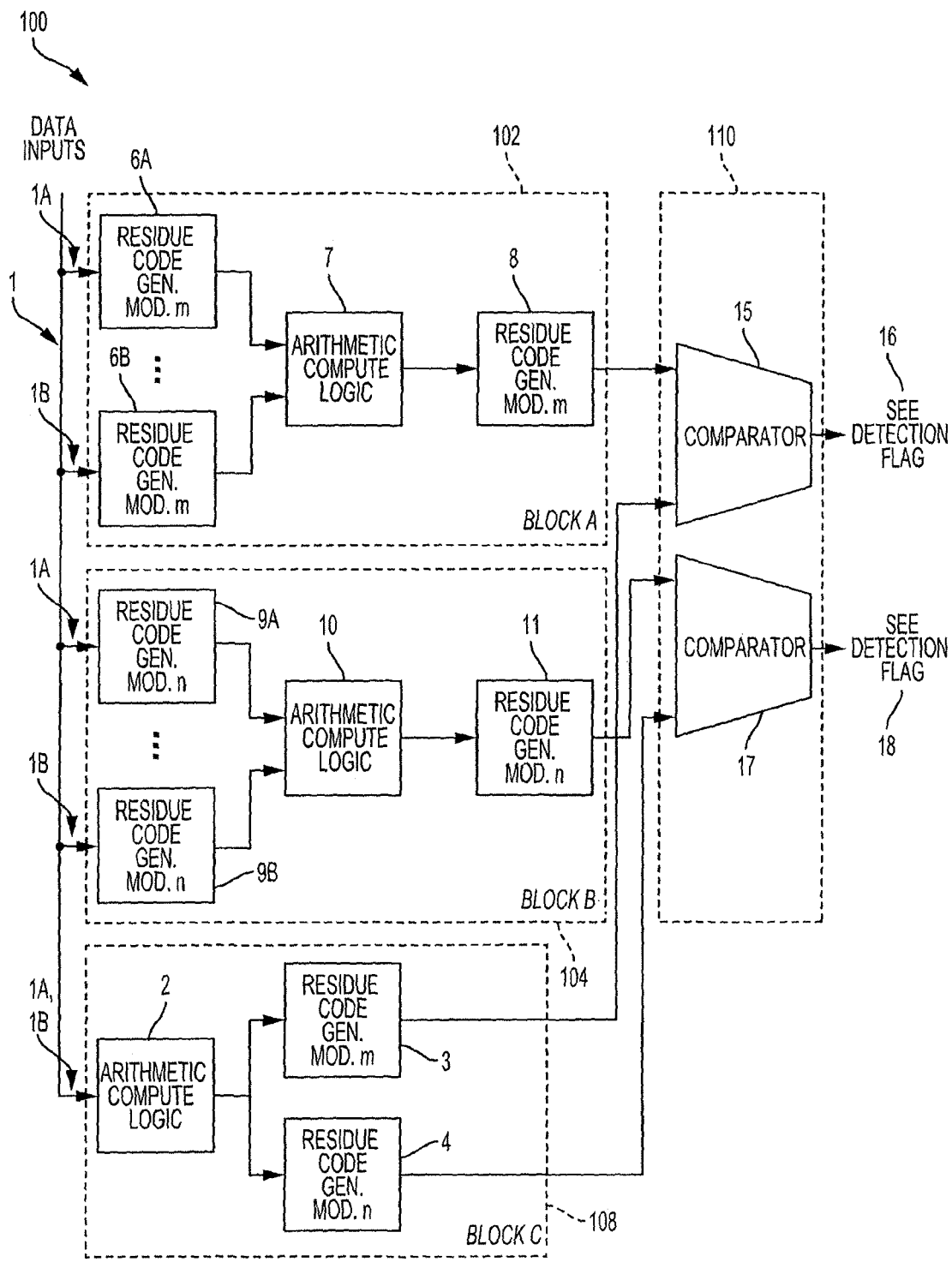
FIG. 1 illustrates an exemplary system for detecting single event effects in compute logic using residue codes, according to various embodiments of the invention.

FIG. 1 is a block diagram illustrating an error detecting system 100 when applied to compute kernels in accordance with embodiments of the invention. In some embodiments, the system 100 is an apparatus for detecting errors. The system 100 detects the presence of Single Event Effects (SEEs) that can result in Single Event Upsets (SEUs) within arithmetic compute logic. A portion of the system 100 is made to operate synchronously to the arithmetic compute logic for which the system 100 detects SEEs. The system 100 makes use of three blocks of digital logic that operate concurrently. The digital outputs of these blocks are monitored to determine the presence of SEEs within said arithmetic compute logic and or within the overall system containing said arithmetic compute logic.

A set of two digital residue code generator logic modules are coupled to the arithmetic compute logic constituting one of the three blocks employed by the apparatus. The remaining two blocks each contain a different set of residue code generator logic modules and accompanying arithmetic compute logic. The monitoring component contains a set of two parallel comparators. Each comparator monitors for differences between half of the outputs from the block containing the arithmetic compute logic and those of one of the remaining blocks of digital logic. If any one of the comparators reveals a difference in the block digital output pair values then this is indicative of an SEE strike to the overall digital system containing the arithmetic compute logic. If both comparators concurrently reveal differences in the digital values of any of the block output pairs then this is an indication of a fault in the arithmetic compute to which the system 100 is coupled.

The system 100 detects Single Event Effect strikes that are manifested as Single Event Upsets in compute kernels by leveraging bi-residue codes, arithmetic compute logic and comparison logic. The system 100 applies bi-residue codes to the output of the compute kernel and compares the produced outcome to that of two sets of logically equivalent reduced compute kernel each operating on the outcomes of two residue code generators applied to the operands of the original compute kernel. The system 100 performs concurrent pairwise comparison between output sets. In some embodiments, all of the components of the system 100 are in a single device or apparatus.

Any instance where any of the compared outcomes are not equivalent indicates the presence of Single Event Effects strikes to the overall system containing the compute kernel. Instances where both sets of compared output are not equivalent indicate the presence of an SEE induced error in the compute kernel to which the invention is coupled.

FIG. 1 illustrates the manner in which bi-residue codes, arithmetic compute logic, and comparator logic comprise the embodiment of the invention when applied to detecting errors induced by Single Event Effects in arithmetic computation logic. The system applies particularly to arithmetic computation logic with an arbitrary number of operands and outputs. This arithmetic computation logic 2 (also referred to as a compute kernel) may contain state elements in order to perform the computations for which it was designed.

As used herein, a bi-residue code of a number x is the representation of that number by a set of three numbers $\{x, R(x), Q(x)\}$ where $R\{x\}$ is a check for x and is equal to x reduced modulo a modulus m. Similarly, $Q\{x\}$ is a check for x and is equal to x reduced modulo a modulus n.

The system leverages properties of residue codes such that for a set of operands $\{n\}$ and their generated bi-residue codes $\{(n,R(n),Q(n))\}$ for moduli m and n, there exists, for a given arithmetic operation OP: $OP[\{(n,R(n)\}]=(OP[\{n\}], OP[\{R(n)\}])$ mod m and $OP[\{(n,Q(n)\}]=(OP[\{n\}], OP[\{Q(n)\}])$ mod n.

The system 100 includes a first-modulus digital logic block 102 (or first-modulus digital logic unit), a second-modulus digital logic block 104 (or second-modulus digital logic unit), a kernel digital logic block 108 (or kernel digital logic unit), and a detector 110. In some embodiments, all of the components of the system 100 are hardware components.

The first-modulus digital logic block 102 includes a set of first-modulus residue code generators 6, an arithmetic computation logic module 7 (also referred to as a compute kernel), and an output first-modulus residue code generator 8. The first-modulus residue code generators 6 and 8 of the first-modulus digital logic block 102 are configured to reduce their respective inputs by a first modulus m. The set of first-modulus residue code generators 6 for the modulus m is coupled to the data inputs 1.

The set of first-modulus residue code generators 6 are coupled to each of the data inputs 1 in order to reduce each b-bit operand of the data inputs 1 to a number in base m. For example, the first-modulus residue code generator 6A receives an operand 1A of the data inputs and reduces the operand 1A to a number in base m, and the residue code generator 6B receives an operand 1B of the data inputs and reduces the operand 1B to a number in base m. Those first-modulus-reduced operands are provided to the compute kernel 7, and the output of the compute kernel 7 is provided to output first-modulus residue code generator 8 for reducing by modulus m. The output first-modulus residue generator 8 provides the output of the first-modulus digital logic block 102. While only two first-modulus residue code generators 6A and 6B are shown in the set of first-modulus residue code generators 6, any number of first-modulus residue code generators may be included, for as many operands are present in the data input 1.

The set of second-modulus residue code generators 9 are coupled to each of the data inputs 1 in order to reduce each b-bit operand of the data inputs 1 to a number in base n. For example, the second-modulus residue code generator 9A receives an operand 1A of the data inputs and reduces the operand 1A to a number in base n, and the residue code generator 9B receives an operand 1B of the data inputs and reduces the operand 1B to a number in base n. Those second-modulus-reduced operands are provided to the compute kernel 10, and the output of the compute kernel 10 is provided to an output second-modulus residue code generator 11 for reducing by modulus n. The output of the second modulus residue generator 11 is the output of the second-modulus digital logic block 104. While only two second-modulus residue code generators 9A and 9B are shown in the set of second-modulus residue code generators 9, any number of second-modulus residue code generators may be included, for as many operands are present in the data input 1.

The compute kernel 2 of the kernel digital logic block 108 receives the data inputs 1 (e.g., operands 1A and 1B), and provides the outputs to a first-modulus residue code generator 3 and a second-modulus residue code generator 4. The outputs of the first-modulus residue code generator 3 and the second-modulus residue code generator 4 are the outputs of the kernel digital logic block 108.

The detector 110 includes a first comparator 15 and a second comparator 17, which use combinatorial comparison logic. The first comparator 15 is associated with the first modulus m and compares the output of the first-modulus digital logic block 102 and the output of the first-modulus residue code generator 3 of the kernel digital logic block 108. The first comparator 15 outputs a first detection flag 16. The first detection flag 16 indicates whether the inputs to the first comparator 15 match. In some embodiments, when the first detection flag 16 has a zero value, the inputs to the first comparator 15 match, and when the first detection flag 16 has a non-zero value, the inputs to the first comparator 15 do not match. When the first detection flag 16 has a non-zero value, the non-zero value may be unique and may correspond to the modulus m.

The second comparator 17 is associated with the second modulus n and compares the output of the second-modulus digital logic block 104 and the output of the second-modulus residue code generator 4 of the kernel digital logic block 108. The second comparator 17 outputs a second detection flag 18. The second detection flag 18 indicates whether the inputs to the second comparator 17 match. In some embodiments, when the second detection flag 18 has a zero value, the inputs to the second comparator 17 match, and when the second detection flag 18 has a non-zero value, the inputs to the second comparator 17 do not match. When the second detection flag 18 has a non-zero value, the non-zero value may be unique and may correspond to the modulus n.

When the first detection flag 16 indicates a match and the second detection flag 18 indicates a match, there are no detected SEE events, and no anticipated faults or errors. When only one of the first detection flag 16 or the second detection flag 18 indicates a mismatch there may not be a detected SEE event, and no faults or errors are likely.

However, when the first detection flag 16 indicates a mismatch and the second detection flag 18 indicates a mismatch, there is a detected SEE event. In this case, a correction may be performed, by discarding the erroneous data and/or re-computing the data.

The detector 110 may produce an identifier output indicating whether a component associated with a particular modulus is affected by the SEE event or whether the compute kernel 2 is affected by the SEE event. For example, the detector 110 may produce an identifier output of one when a component associated with modulus n is affected (e.g., second-modulus residue code generator 4, second-modulus residue code generators 9, output second-modulus residue code generator 11, or second comparator 17); the detector 110 may produce an identifier output of two when a component associated with modulus m is affected (e.g., first-modulus residue code generator 3, first-modulus residue code generators 6, output first-modulus residue code generator 8, or first comparator 15); and the detector 110 may produce an identifier output of three when the compute kernel 2 is affected. The detector 110 may scale with computational blocks, depending on the application, by including more comparators. Further, in some embodiments, multiple smaller detectors can be applied to a larger computation block, and in other embodiments, multiple larger detectors can be applied to a smaller computation block.

The first modulus m is selected for the set of first-modulus residue code generators 6 such that the algebraic set representable by $2^m$ is larger than the algebraic set representable by the combined bits of the largest operand to the compute kernel. The second modulus n is selected for the set of second-modulus residue code generators 9 such that the algebraic set representable by the $2^n$ is larger than the algebraic set representable by the combined bits of the largest operand to the compute kernel. Furthermore, moduli m and n are selected such that both moduli are coprime, whereby the greatest common divisor to both m and n is the integer 1.

A residue code generator architecture circuitry may make use of a carry save adder tree feeding an m or n-bit adder with end-around carry. The circuit structure of the residue code generators 3, 4, 6, 8, 9, and 11 may be optimized based on the size of the inputs applied to each residue code generator.

Compute kernels 7 and 10 may be reduced set compute kernels, which perform the same logical function to an operand having a particular bit size that the main compute kernel 2 performs to the up to b-bit operands of the data inputs 1. For example, compute kernel 7 may be a reduced set compute kernel capable of performing the same logical function to m-bit operands that the main compute kernel 2 performs to the up to b-bit operands of the data inputs 1. In addition, compute kernel 10 may be a reduced set compute kernel capable of performing the same logical function to n-bit operands that the main compute kernel 2 performs to the up to b-bit operands of the data inputs 1.

When the compute kernels 7 and 10 are reduced set compute kernels, they may have a significantly reduced circuit footprint structure compared to the arithmetic compute logic necessary to process the b-m or b-n additional bits required for compute kernel 2.

The representation of the output of compute kernel 7 of the first-modulus digital logic block 102 may mathematically require more than m bits. Therefore, the first-modulus digital logic block 102 also includes the first-modulus residue code generator 8, which ensures that the output of compute kernel 7 is reduced to be no more than m-bits. Similarly, the representation of the output of compute kernel 10 may mathematically require more than n bits. Therefore, the second-modulus digital logic block 104 also includes the second-modulus residue code generator 10, which ensures that the output of compute kernel 10 is reduced to be no more than n-bits.

In some embodiments, the detection performed by the system 100 is embedded into the processor to minimize control and reaction to fault delay. In some embodiments, the detection flag is available before the data is stored, allowing for the preemptive discarding of data or allowing for the preemptive initiation of data re-computation. In some embodiments, the system 100 allows for 30-40 percent less temporal filtering, as compared to conventional systems. In addition, fewer transistors may be used, as compared to conventional systems. The speed of the system 100 allows for less propagation delay to do the detection of the SEE event.

In some embodiments, a display is configured to render a user interface including an indication that a SEE has been detected. A user may take appropriate measures, such as recalculating the result of the compute kernel 2 and/or discarding the results of the compute kernel 2.

FIGS. 2A-2C illustrate various scenarios of different components in system 100 being affected by a Single Event Effect. For all 12 scenarios presented, the system 100 is applied to a standard dual operand four-bit adder. While a dual operand adder is shown as the compute kernel, other modules performing other computations may be used in various other embodiments. The dual input four-bit adder produces a five-bit output that covers the entire range of input combinations. The two four-bit operands 1A and 1B are designated henceforth as "Operand A" and "Operand B," respectively. The first row in all the scenarios within FIGS. 2A-2C is a header row.

The left of the first row contains the scenario designation. The right of the first row describes the location affected by the Single Event Effect Strike condition for which a Single Event Upset is generated in the specific scenario. The applied Single Event Effect affects different circuit components in each of the scenarios in order to cover the comprehensive set of standard operating modes for the invention. The right side of the first row also contains a reminder of the nature of the circuit to which the invention is applied as well as an embodiment of the invention that is applicable to said circuits.

For the scenarios in FIGS. 2A-2C, a first-modulus residue code generator 3, 6, 8 leverages a modulus m of 7 (seven), and a second-modulus residue code generator 4, 9, 11 leverages a modulus n of 15 (fifteen). These moduli values are arbitrarily selected in accordance with the conditions described herein. While a lower number modulus may provide computational quickness, the probability that an error may not be detected is higher than a higher number value modulus. However, a too high of a number value modulus may be computationally expensive.

For all scenarios in FIGS. 2A-2C, "Operand A" is assigned the arbitrary value of decimal "13" which is represented in hexadecimal notation "xD," and "Operand B" is assigned the arbitrary value of decimal "10" which is represented in hexadecimal notation "xA." The left column designates points at different stages for which values are observed in order to aide in understanding the overall operation of the system 100. It should be noted that this is for illustrative purposes only and arithmetic values are typically not observed at these points for embodiments of the invention. The symbol "+" is the binary arithmetic operator that indicates addition. The "%" symbol is the modulo operator that yields the remainder of the Euclidean division of a dividend by a divisor. In all scenarios in FIGS. 2A-2C, pertinent top modulus in the divisor is that of the modulus employed by the residue code generator, seven "7". In all scenarios in FIGS. 2A-2C, pertinent top modulus n the divisor is that of the modulus employed by the residue code generator; fifteen "15." The "(" and ")" left and right parenthesis symbols are used to indicate the precedence of an arithmetic operation that is operations within a set parenthesis are computed and completed prior to any operation outside of the parenthesis. The right column contains the values at the designated observation identified in the left column. Values in the right column preceded by an "x" are in hexadecimal notation, and any other values are in binary notation.

Scenario 1 in FIG. 2A shows the operation of the invention applied to the dual-input four-bit adder in the absence of any Single Event Effects.

"Operand A" with a value of "xD" has a remainder of "x6" when reduced modulo 7. This may be performed by first-modulus residue code generator 6A. "Operand B" with a value of "xA" has a remainder of "x3" when reduced modulo 7. This may be performed by first-modulus residue code generator 6B. The sum of the values "x6" and "x3" is "x9," (performed by compute kernel 7) and "x9" reduced modulo 7 results in "x2" (performed by first-modulus residue code generator 8).

"Operand A" with a value of "xD" has a remainder of "xD" when reduced modulo 15. This may be performed by second-modulus residue code generator 9A. "Operand B" with a value of "xA" has a remainder of "xA" when reduced modulo 15. This may be performed by second-modulus residue code generator 9B. The sum of the values "xD" and "xA" is "x17," (performed by compute kernel 10) and "x17" reduced modulo 15 results in "x2" (performed by second-modulus residue code generator 11).

The sum of "Operand A" with a value of "xD" and "Operand B" with a value of "xA" results in the value "x17." This may be performed by compute kernel 2. "x17" reduced modulo 7 results in "x2" (performed by first-modulus residue code generator 3) and "x17" reduced modulo 15 results in "x2" (performed by second-modulus residue code generator 4).

In this scenario, both values match, as determined by the detector 110, indicating that no upsets from a Single Event Effect was observed. Accordingly, the designator for scenario 1 in FIG. 2A, the "SEE DETECTION FLAG," shows a value of "0."

Scenario 2 in FIG. 2A shows the operation of the invention applied to the dual-input four-bit adder with a Single Event Effect strike applied to the first-modulus residue code generator 6A of the first-modulus digital logic block 102.

Since the Single Event Effect strike is applied, "Operand A" with a value of "xD" erroneously results in a remainder of "x7" when reduced modulo 7. "Operand B" with a value of "xA" has a remainder of "x3" when reduced modulo 7. This may be performed by first-modulus residue code generator 6B. The sum of the values "x7" and "x3" is "xA," (performed by compute kernel 7) and "xA" reduced modulo 7 results in "x3" (performed by first-modulus residue code generator 8).

"Operand A" with a value of "xD" has a remainder of "xD" when reduced modulo 15. This may be performed by second-modulus residue code generator 9A. "Operand B" with a value of "xA" has a remainder of "xA" when reduced modulo 15. This may be performed by second-modulus residue code generator 9B. The sum of the values "xD" and "xA" is "x17," (performed by compute kernel 10) and "x17" reduced modulo 15 results in "x2" (performed by second-modulus residue code generator 11).

The sum of "Operand A" with a value of "xD" and "Operand B" with a value of "xA" results in the value "x17." This may be performed by compute kernel 2. "x17" reduced modulo 7 results in "x2" (performed by first-modulus residue code generator 3) and "x17" reduced modulo 15 results in "x2" (performed by second-modulus residue code generator 4).

In this scenario, the value from the first-modulus digital logic block 102 "x3" does not match the output from the first-modulus residue code generator 3 "x2," (as detected by comparator 15 of detector 110) indicating that an upset from a Single Event Effect strike was observed. The value from the second-modulus digital logic block 104 "x2" does match with the output from the second-modulus residue code generator 4 "x2" (as detected by comparator 17 of detector 110). Accordingly, the designator for scenario 2 in FIG. 2A, the "SEE DETECTION FLAG," is shows a value of "1."

Scenarios 3-12 illustrate further situations where various elements of the system 100 have the Single Event Effect Strike applied to the various elements.

Figure 3:
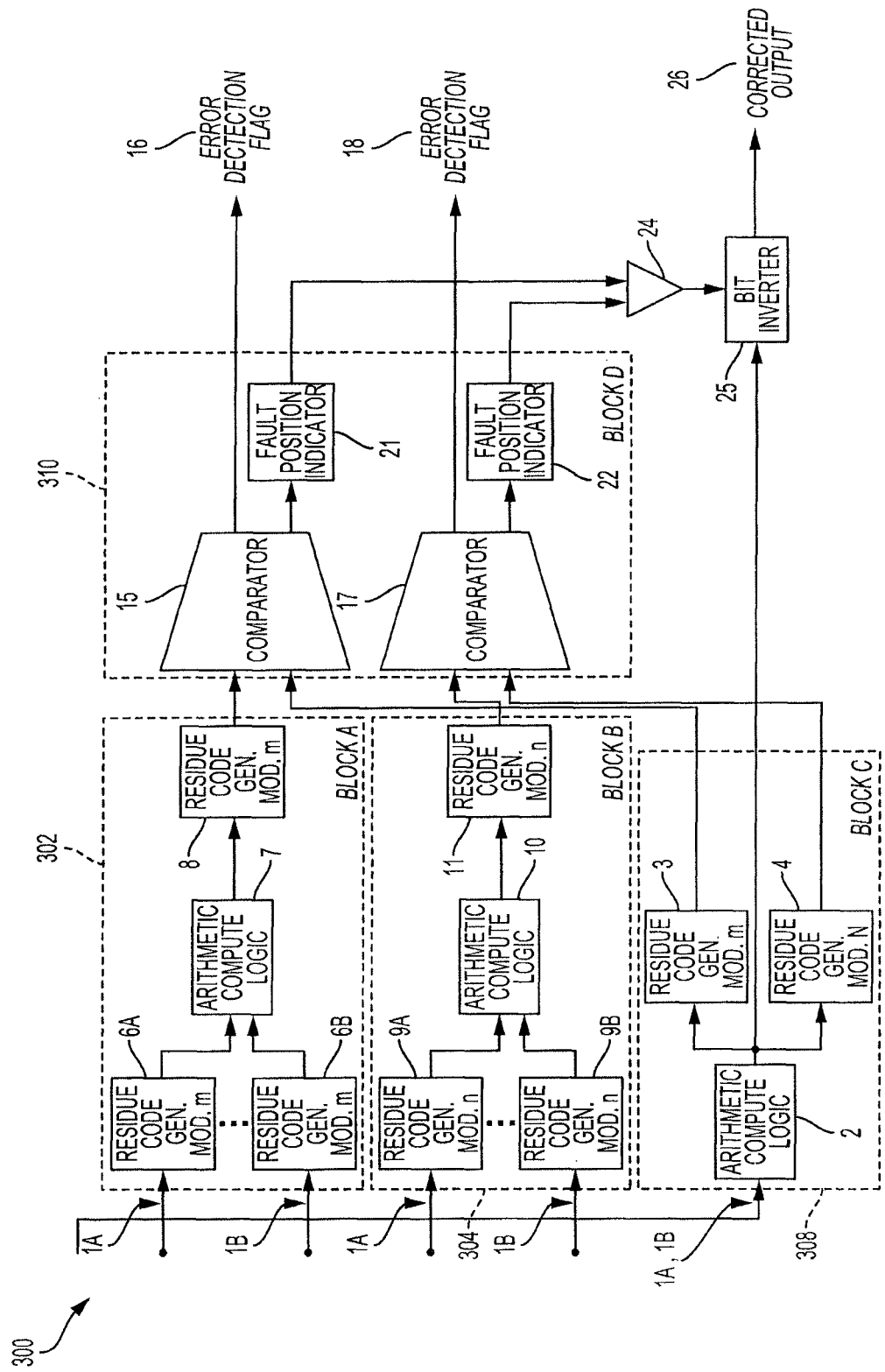
FIG. 3 illustrates an example low overhead system for detecting single event effects and correcting single bit upsets in compute logic using residue codes, according to various embodiments of the invention.

FIG. 3 illustrates a system 300 for detecting the presence of Single Event Effects (SEE) and for providing an assured and reliable way to correct single faults within arithmetic compute logic caused by Single Event Upsets (SEU) resulting from SEEs.

The system 300 may be up to three times faster than conventional systems. In conventional redundant systems, a voter portion module within a triple module redundancy is the source of delay. A large amount of temporal filtering is required for quenching transients in the conventional systems. The absence of the voter portion module and less temporal filtering result in the increased speed achieved by the system 300.

In some embodiments, all of the components of the system 300 are in a single device or apparatus. In some embodiments, all of the components of the system 300 are hardware components.

A portion of the system 300 is made to operate synchronously to the arithmetic compute logic for which the apparatus detects SEEs. The system 300 makes use of three blocks of digital logic that operate concurrently. The digital outputs of these blocks are monitored to determine the presence of SEEs within said arithmetic compute logic and or within the overall system containing said arithmetic compute logic. The digital logic responsible for monitoring is coupled with error correction logic capable of mitigating single-bit faults. A set of two digital residue code generator logic modules are coupled to the arithmetic compute logic constituting one of the three concurrent blocks employed by the apparatus. The remaining two blocks each contain a different set of residue code generator logic modules and accompanying arithmetic compute logic.

The system 300 is similar to the system 100, and like elements are numbered similarly. In particular, first-modulus digital logic block 302 is similar to first-modulus digital logic block 102, second-modulus digital logic block 304 is similar to second-modulus digital logic block 104, kernel digital logic block 308 is similar to kernel digital logic block 308, and the detector 310 is similar to detector 110.

The detector 310 of system 300 includes a first fault position indicator 21 and a second fault position indicator 22. The first fault position indicator 21 is configured to determine which bit is flipped by computing the difference between the output of the first-modulus digital logic block 102 and the first-modulus residue code generator 3 of the kernel digital logic block 108. This information is passed to the first fault position indicator 21 by the first comparator 15. The second fault position indicator 25 is configured to determine which bit is flipped by computing the difference between the output of the second-modulus digital logic block 104 and the second-modulus residue code generator 4 of the kernel digital logic block 108. This information is passed to the second fault position indicator 25 by the second comparator 17. In some embodiments, the computed difference is an absolute value subtraction of the two values.

In addition to the operation described with respect to system 100, raw comparator values included in the first comparison data and the second comparison data are passed from the detector 310 to error syndrome identifier 24, which produces an error syndrome for each residue code. A double pairwise comparison of the syndromes reveals the position of the fault. Error syndrome identifier 24, which may be made of differentiator circuitry, communicates whether an error is present, and which bit is affected by the error, to a bit inverter 25. The bit inverter 25 is only activated for consistent syndrome pairs in order to flip the necessary bit to correct a single fault within the arithmetic compute logic 2 to which the invention is coupled. No correction is applied for circumstances where there are no error syndromes or non-consistent error syndromes. The invention is resilient SEUs to the internal circuitry of the invention. In the event of more than one fault, the invention will correct one fault.

In some embodiments, priority can be given to the most significant bit to correct to allow for better computational approximations. In addition, in some embodiments, a priority can be set to the bits to select the bit to correct when there are more than one fault. The error syndrome identifier 24 may identify the bit to flip based on the established priority. The priority may be stored in a memory of the system 300. The system 300 can detect and distinctly distinguish up to two different and arbitrary faults and can identify more than two bit faults.

FIGS. 4A-4D illustrate tables of exemplary scenarios using the system shown in FIG. 3, according to various embodiments of the invention. Scenarios 1-16 illustrate the various outputs of the elements of system 300 in order to illustrate how the system works. Each scenario 2-16 identifies an element which has a SEE strike applied to it, and each scenario 2-16 illustrates how the system 300 detects the SEE strike and corrects the output of the system 300.

Figure 5:
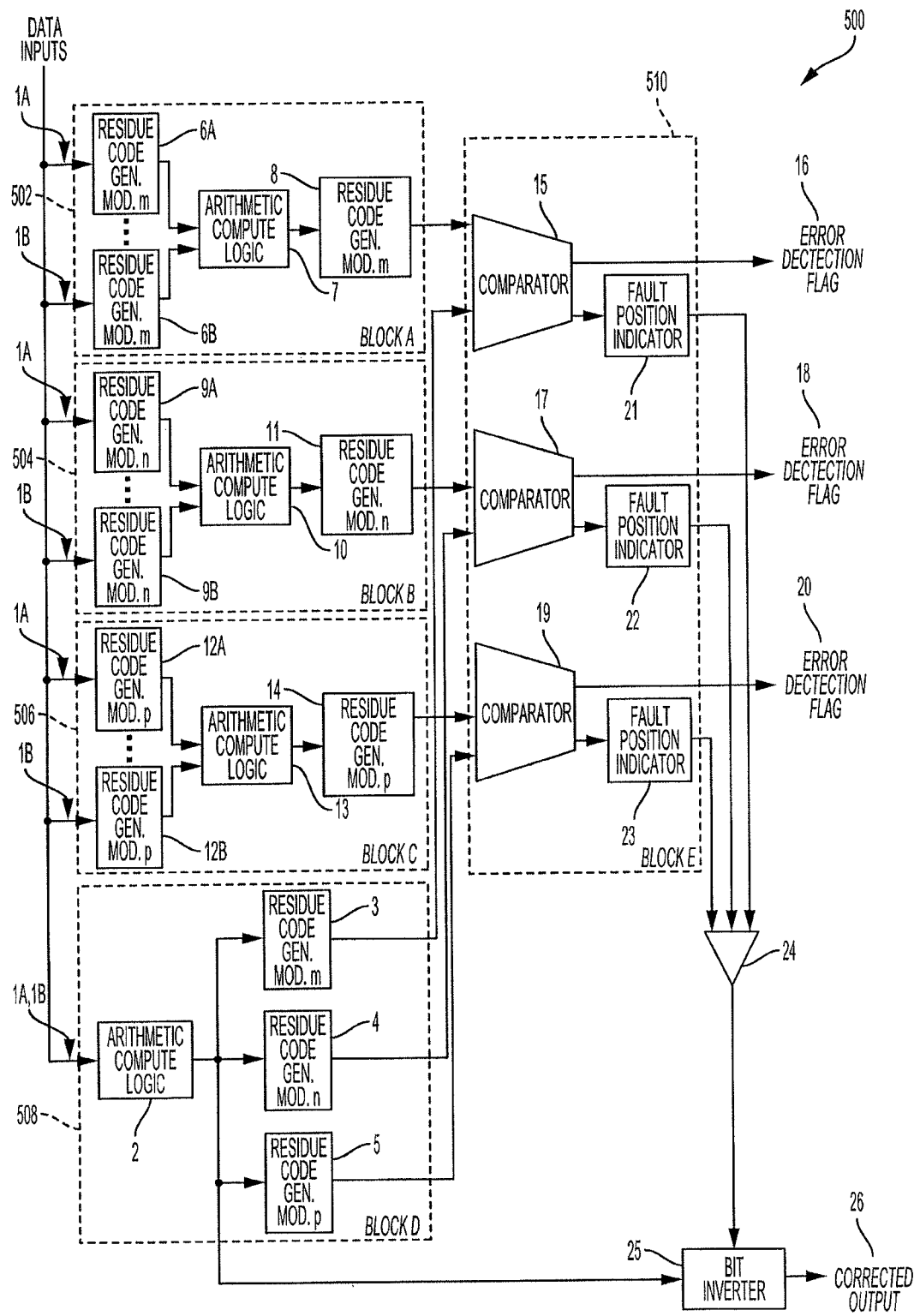
FIG. 5 illustrates an exemplary low overhead system for detecting single event effects and correcting double bit upsets in compute logic using residue codes, according to various embodiments of the invention.

FIG. 5 illustrates a system 500 for detecting the presence of Single Event Effects (SEE) and for assuredly and reliably correcting single-bit and double-bit faults within arithmetic compute logic caused by Single Event Upsets (SEU) resulting from SEEs.

The system 500 may simultaneously correct two-bit faults at arbitrary bit locations that do not have to be consecutive. The system 500 may be up to three times faster than conventional systems. In conventional redundant systems, a voter portion module within a triple module redundancy is the source of delay. A large amount of temporal filtering is required for quenching transients in the conventional systems. The absence of the voter portion module and less temporal filtering result in the increased speed achieved by the system 500.

The system 500 is similar to systems 100 and 300, and like elements are numbered similarly. A portion of the system 500 is made to operate synchronously to the arithmetic compute logic for which the apparatus detects SEEs. The system 500 makes use of four blocks of digital logic that operate concurrently (e.g., first-modulus digital logic block 502, second-modulus digital logic block 504, third-modulus digital logic block 506, and kernel digital logic block 508). Third-modulus digital logic block 506 is substantially similar to the first-modulus digital logic block 502 and second-modulus digital logic block 504, but corresponding to a third modulus p. In some embodiments, all of the components of the system 500 are hardware components.

The digital outputs of these blocks are monitored by the detector 510 to determine the presence of SEEs within said arithmetic compute logic and or within the overall system containing said arithmetic compute logic. The detector 510 is coupled with error syndrome identifier 24 and bit inverter 25 to mitigate single-bit and double-bit faults.

A set of three digital residue code generator logic modules 3, 4, and 5 are coupled to the arithmetic compute logic 2 constituting the kernel digital logic block 508 of the system 500. The remaining three blocks (first-modulus digital logic block 502, second-modulus digital logic block 504, third-modulus digital logic block 506) each contain a different set of residue code generator logic modules and accompanying arithmetic compute logic.

The detector 510 contains a set of three parallel comparators 15, 17, 19. Each comparator monitors for differences between a third of the outputs from the block containing the arithmetic compute logic and those of one of the remaining blocks of digital logic. If any one of the comparators reveals a difference in the block digital output pair values then this is indicative of an SEE strike to the overall digital system containing the arithmetic compute logic. If all three comparators concurrently reveal differences in the digital values of any of the block output pairs then this is an indication of one or more fault in the arithmetic compute to which the apparatus is coupled.

The raw comparator values from the comparators 15, 17, 19 are passed to error syndrome identifier 24 that produces an error syndrome for each residue code. Error syndrome identifier 24, which may include differentiator circuitry, applies the error syndromes to the bit inverter 25. The bit inverter 25 is only activated for consistent syndrome triplets in order to flip the necessary bit or two bits to correct a single fault within the arithmetic compute logic to which the invention is coupled. No correction is applied for circumstances where there are no error syndromes or non-consistent error syndromes. The invention is resilient SEUs to the internal circuitry of the invention. In the event of more than two faults, the system 500 will correct two faults.

In some embodiments, priority can be given to the most significant bit to correct to allow for better computational approximations. In addition, in some embodiments, a priority can be set to the bits to select the bit to correct when there are more than one fault. The error syndrome identifier 24 may identify the bit to flip based on the established priority. The priority may be stored in a memory of the system 300. The system 500 can detect and distinguish up to three different and arbitrary faults, and can identify more than three-bit faults. The system 500 can also be used as an environment gradient sensor to detect the surrounding radiation environment.

While the system 500 is configured to correct single-bit and double-bit faults, more numbers of bits are capable of being corrected with the addition of more digital logic blocks (e.g., a fourth-modulus digital block, a fifth-modulus digital block, etc.). In general, the systems described herein are capable of detecting x faults with x moduli, and are capable of correcting x faults with x+1 moduli.

FIGS. 6A-6G illustrate tables of exemplary scenarios using the system shown in FIG. 5, according to various embodiments of the invention. Scenarios 1-25 illustrate the various outputs of the elements of system 500 in order to illustrate how the system works. Each scenario 2-25 identifies an element which has a SEE strike applied to it, and each scenario 2-25 illustrates how the system 500 detects the SEE strike and corrects the output of the system 500.

Figure 7:
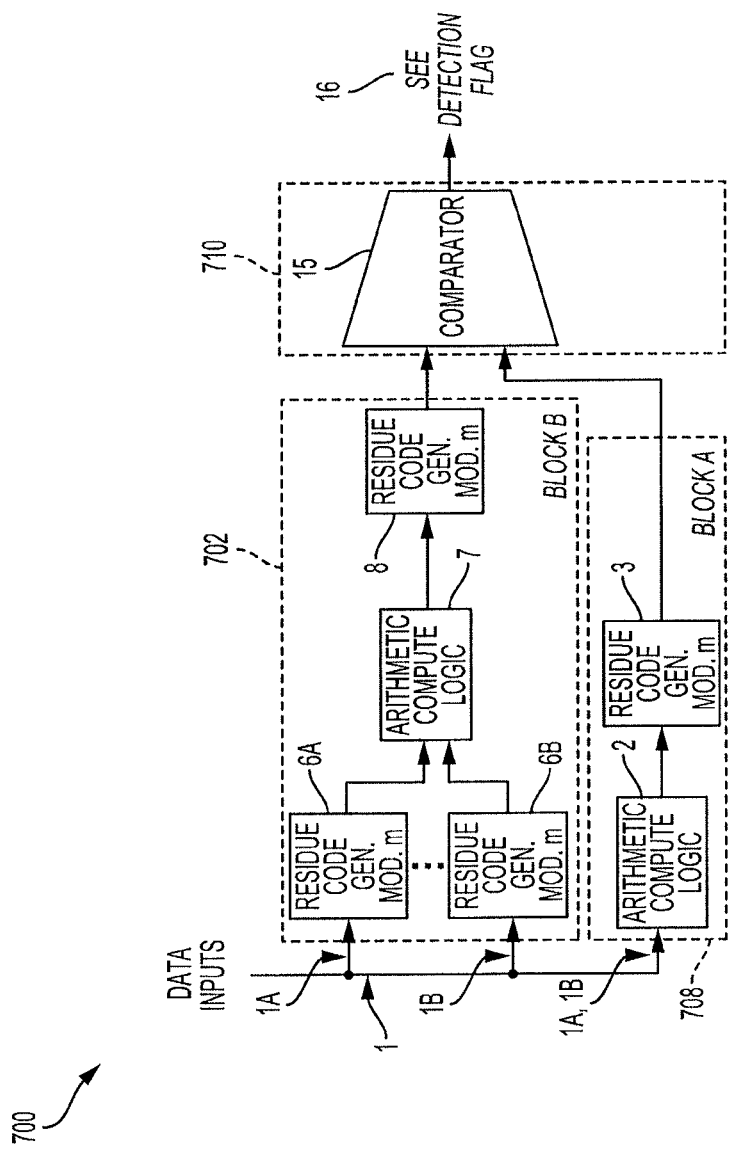
FIG. 7 illustrates an exemplary low overhead system for detecting single event effects in digital systems using residue codes, according to various embodiments of the invention.

FIG. 7 illustrates a system 700 for detecting the presence of Single Event Effects that might result in Single Event Upsets within a larger digital system. The larger digital electronic system includes at least one instance of arithmetic compute logic to which the system 700 is coupled. A portion of the system 700 is made to operate synchronously to the arithmetic compute logic to which a residue code generator component of the system 700 is coupled. The digital output from the residue code generator component attached to the digital electronic system arithmetic compute logic and that of the portion of the system 700 that operates concurrently with said logic are compared. The comparator reveals any difference in residue code values thus revealing the occurrence of Single Event Effects (SEE) within the digital system.

The system 700 detects Single Event Effect strikes that are manifested as Single Event Upsets in combinatorial logic by leveraging a compute kernel element circuit present in the designated system to which residue code generation and comparison logic is applied. The system 700 applies residue codes to the output of the compute kernel and compares the produced outcome to that of a logically equivalent reduced compute kernel operating on the outcomes of residue code generators applied to the operands of the original compute kernel. Any instance where the compared outcomes are not equivalent indicates the presence of Single Event Effects strikes to the circuits of the designated system to which the invention is applied.

The system 700 is similar to systems 100, 300 and 500, and like elements are numbered similarly. The system includes a first-modulus digital logic block 702, which is similar to first-modulus digital logic block 102, a kernel digital logic block 708, which is similar to kernel digital logic block 108, and detector 710, which is similar to detector 110. In some embodiments, all of the components of the system 700 are hardware components.

FIGS. 8A-8B illustrate tables of exemplary scenarios using the system shown in FIG. 7, according to various embodiments of the invention. Scenarios 1-8 illustrate the various outputs of the elements of system 700 in order to illustrate how the system works. Each scenario 2-8 identifies an element which has a SEE strike applied to it.

Figure 9:
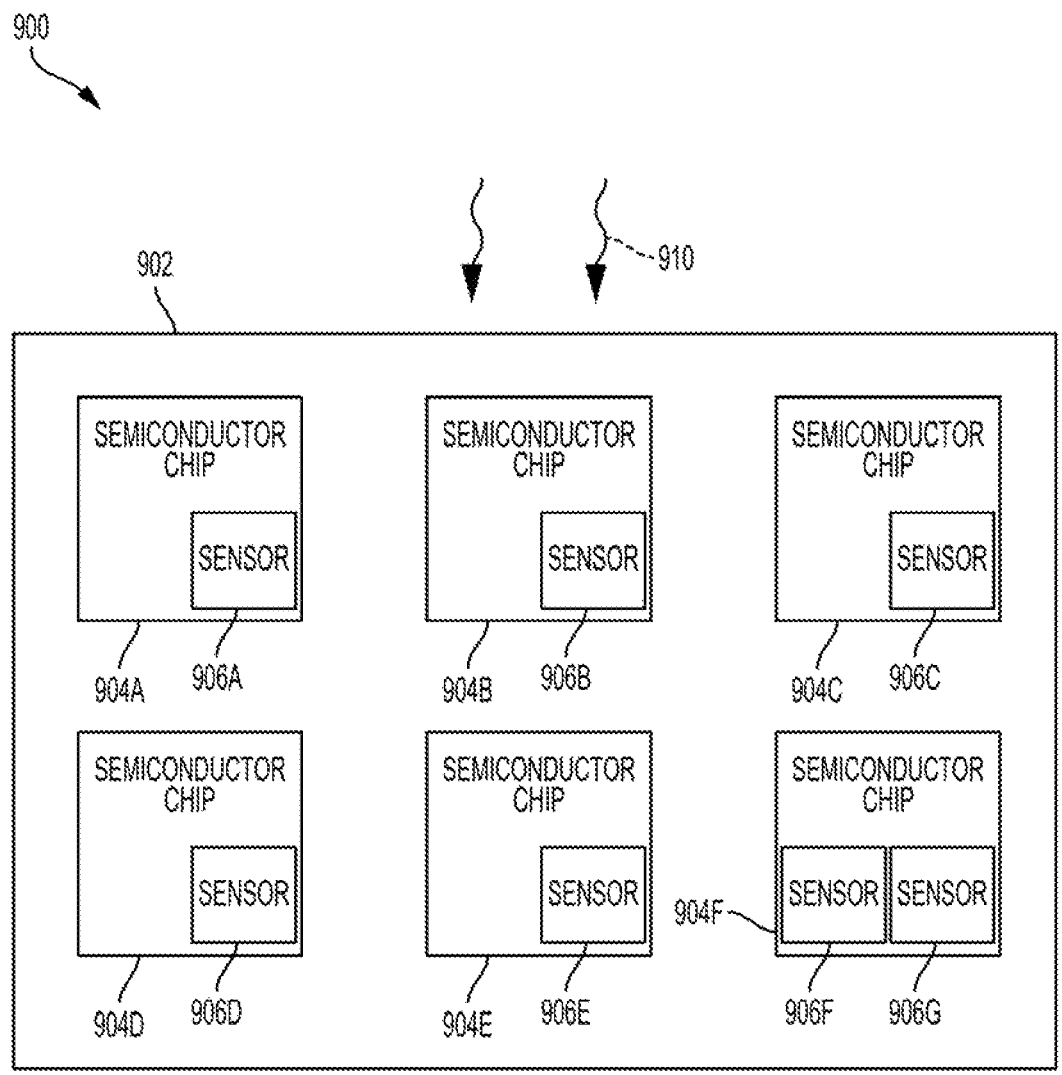
FIG. 9 illustrates a use of the system shown in FIG. 7 for detecting radiation, according to various embodiments of the invention.

FIG. 9 illustrates use of a system similar to system 700 as a radiation sensor. The system 900 includes a microelectronics device 902, which contains one or more semiconductor chips 904. The semiconductor chips 904 each include a sensor 906. The sensor 906 is similar to system 700, and may be configured to be a built-in low overhead and low-cost sensor that is embedded in a semiconductor chip 904 and configured to detect and react to a radiation environment. The radiation may be caused by cosmic rays 910 from the Sun.

While FIG. 9 illustrates a single sensor 906 per semiconductor chip 904, in some embodiments, multiple sensors can be embedded to generate a historical radiation susceptibility map for a processing element. The sensors may detect the presence of SEEs, and can allow for dynamic powering and scaling. No additional circuitry or external modules are required for radiation detection. Embedding multiple sensors across the semiconductor chip allows for sensitive cross-section characterization.

In some embodiments, the system 900 allows the semiconductor chip 904 to adapt to processing based on the radiation environment. An array of sensors 906 allow for the dynamic adaptation or control of the sensors 906 based on the radiation environment and to enable or disable computing functions or the density or distribution of the processing.

Multiple sensors may be fabricated on each processor, and the sensors may be distributed across the processor, as illustrated by processor 904F and sensors 906F and 906G. Susceptibility embedded control of the processors may be possible. Each processor has control to turn on and off the operations of the sensors that are embedded thereon. The processor can immediately disable some of its tasks based on a reading or spike in the radiation data received from the sensors. Essentially, the sensors serve as a free embedded instrument to characterize the radiation environment.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for detecting single event effects, the system comprising:
    a data input configured to provide one or more operands;
    a first-modulus processor connected to the data input, and configured to:
        reduce each of the one or more operands by a first modulus,
        apply an arithmetic compute logic to the reduced one or more operands to produce a first compute output, and
        reduce the first compute output by the first modulus;
    a second-modulus processor connected to the data input and configured to:
        reduce each of the one or more operands by a second modulus,
        apply the arithmetic compute logic to the reduced one or more operands to produce a second compute output, and
        reduce the second compute output by the second modulus;
    a kernel processor connected to the data input, and configured to:
        apply the arithmetic compute logic to the one or more operands to produce a kernel compute output, output the kernel compute output reduced by the first modulus, and output the kernel compute output reduced by the second modulus; and a detector connected to the first-modulus processor, the second-modulus processor, and the kernel processor, the detector configured to:

receive, from the first-modulus processor, the reduced first compute output, receive, from the second-modulus processor, the reduced second compute output, receive, from the kernel processor, the kernel compute output reduced by the first modulus and the kernel compute output reduced by the second modulus, and detect a single event effect based on a comparison of the reduced first compute output and the kernel compute output reduced by the first modulus, and a comparison of the reduced second compute output and the kernel compute output reduced by the second modulus.

2. The system of claim 1, wherein the first-modulus processor comprises:

a set of first-modulus input residue code generators configured to receive the one or more operands from the data input, and reduce the one or more operands by the first modulus, a first compute kernel configured to receive the one or more operands reduced by the first modulus from the set of first-modulus input residue code generators, and apply the arithmetic compute logic to the received reduced one or more operands to produce the first compute output, and a first-modulus output residue code generator configured to receive the first compute output from the first compute kernel, and reduce the first compute output by the first modulus.

3. The system of claim 2, wherein the second-modulus processor comprises:

a set of second-modulus input residue code generators configured to receive the one or more operands from the data input, and reduce the one or more operands by the second modulus, a second compute kernel configured to receive the one or more operands reduced by the second modulus from the set of second-modulus input residue code generators, and apply the arithmetic compute logic to the received reduced one or more operands to produce the second compute output, and a second-modulus output residue code generator configured to receive the second compute output from the second compute kernel, and reduce the second compute output by the second modulus.

4. The system of claim 3, wherein the first modulus m is selected such that the algebraic set representable by $2^m$ is larger than the algebraic set representable by the combined bits of the largest operand to the first compute kernel, wherein the second modulus n is selected such that the algebraic set representable by the $2^n$ is larger than the algebraic set representable by the combined bits of the largest operand to the second compute kernel, and wherein the first modulus m and the second modulus n are both coprime, whereby the greatest common divisor to both the first modulus m and the second modulus n is the integer 1.

5. The system of claim 4, wherein the first compute kernel is a reduced set compute kernel configured to perform the arithmetic compute logic to an operand having a bit size of m-bits, and wherein second compute kernel is a reduced set compute kernel configured to perform the arithmetic compute logic to an operand having a bit size of n-bits.

6. The system of claim 1, wherein the kernel processor comprises:

a third compute kernel configured to receive the one or more operands from the data input, and apply the arithmetic compute logic to the received one or more operands to produce the kernel compute output, a kernel-unit first-modulus output residue code generator configured to receive the kernel compute output, and reduce the kernel compute output by the first modulus, and a kernel-unit second-modulus output residue code generator configured to receive the kernel compute output, and reduce the kernel compute output by the second modulus.

7. The system of claim 1, wherein the detector comprises:

a first comparator configured to compare the reduced first compute output from the first-modulus processor and the kernel compute output reduced by the first modulus from the kernel processor, and a second comparator configured to compare the reduced second compute output from the second-modulus processor and the kernel compute output reduced by the second modulus from the kernel processor.

8. The system of claim 1, wherein the detector is further configured to detect a fault caused by the detected single event effect and determine a position of the detected fault within the kernel compute output, and wherein the system further comprises:

an error syndrome identifier connected to the detector, and configured to generate correction instructions for correcting the detected fault within the kernel compute output, and a bit inverter connected to the error syndrome identifier, and configured to correct the detected fault within the kernel compute output based on the correction instructions.

9. An apparatus for detecting single event effects, the apparatus comprising:

a data input configured to provide one or more operands;

a first-modulus processor connected to the data input, and configured to:

reduce each of the one or more operands by a first modulus, apply an arithmetic compute logic to the reduced one or more operands to produce a first compute output, and reduce the first compute output by the first modulus;

a second-modulus processor connected to the data input and configured to:

reduce each of the one or more operands by a second modulus, apply the arithmetic compute logic to the reduced one or more operands to produce a second compute output, and reduce the second compute output by the second modulus;

a kernel processor connected to the data input, and configured to:

apply the arithmetic compute logic to the one or more operands to produce a kernel compute output, output the kernel compute output reduced by the first modulus, and output the kernel compute output reduced by the second modulus; and a detector connected to the first-modulus processor, the second-modulus processor, and the kernel processor, the detector configured to:

receive, from the first-modulus processor, the reduced first compute output, receive, from the second-modulus processor, the reduced second compute output, receive, from the kernel processor, the kernel compute output reduced by the first modulus and the kernel compute output reduced by second first modulus, and detect a single event effect based on a comparison of the reduced first compute output and the kernel compute output reduced by the first modulus, and a comparison of the reduced second compute output and the kernel compute output reduced by the second modulus.

10. The apparatus of claim 9, wherein the first-modulus processor comprises:

a set of first-modulus input residue code generators configured to receive the one or more operands from the data input, and reduce the one or more operands by the first modulus, a first compute kernel configured to receive the one or more operands reduced by the first modulus from the set of first-modulus input residue code generators, and apply the arithmetic compute logic to the received reduced one or more operands to produce the first compute output, and a first-modulus output residue code generator configured to receive the first compute output from the first compute kernel, and reduce the first compute output by the first modulus.

11. The apparatus of claim 10, wherein the second-modulus processor comprises:

a set of second-modulus input residue code generators configured to receive the one or more operands from the data input, and reduce the one or more operands by the second modulus, a second compute kernel configured to receive the one or more operands reduced by the second modulus from the set of second-modulus input residue code generators, and apply the arithmetic compute logic to the received reduced one or more operands to produce the second compute output, and a second-modulus output residue code generator configured to receive the second compute output from the second compute kernel, and reduce the second compute output by the second modulus.

12. The apparatus of claim 11, wherein the first modulus m is selected such that the algebraic set representable by $2^m$ is larger than the algebraic set representable by the combined bits of the largest operand to the first compute kernel, wherein the second modulus n is selected such that the algebraic set representable by the $2^n$ is larger than the algebraic set representable by the combined bits of the largest operand to the second compute kernel, and wherein the first modulus m and the second modulus n are both coprime, whereby the greatest common divisor to both the first modulus m and the second modulus n is the integer 1.

13. The apparatus of claim 12, wherein the first compute kernel is a reduced set compute kernel configured to perform the arithmetic compute logic to an operand having a bit size of m-bits, and wherein second compute kernel is a reduced set compute kernel configured to perform the arithmetic compute logic to an operand having a bit size of n-bits.

14. The apparatus of claim 9, wherein the kernel processor comprises:

a third compute kernel configured to receive the one or more operands from the data input, and apply the arithmetic compute logic to the received one or more operands to produce the kernel compute output, a kernel-unit first-modulus output residue code generator configured to receive the kernel compute output, and reduce the kernel compute output by the first modulus, and a kernel-unit second-modulus output residue code generator configured to receive the kernel compute output, and reduce the kernel compute output by the second modulus.

15. The apparatus of claim 9, wherein the detector comprises:

a first comparator configured to compare the reduced first compute output from the first-modulus processor and the kernel compute output reduced by the first modulus from the kernel processor, and a second comparator configured to compare the reduced second compute output from the second-modulus processor and the kernel compute output reduced by the second modulus from the kernel processor.

16. The apparatus of claim 9, wherein the detector is further configured to detect a fault caused by the detected single event effect and determine a position of the detected fault within the kernel compute output, and wherein the system further comprises:

an error syndrome identifier connected to the detector, and configured to generate correction instructions for correcting the detected fault within the kernel compute output, and a bit inverter connected to the error syndrome identifier, and configured to correct the detected fault within the kernel compute output based on the correction instructions.

17. A system for characterizing radiation susceptibility, the system comprising:

a plurality of semiconductor devices; and a plurality of sensors distributed across and embedded in each of the plurality of semiconductor devices, each sensor of the plurality of sensors comprising:

a modulus processor having:

a set of modulus input residue code generators configured to receive one or more operands from a data input, and reduce the one or more operands by a modulus, a first compute kernel configured to receive the one or more operands reduced by the modulus from the set of modulus input residue code generators, and apply the arithmetic compute logic to the received reduced one or more operands to produce the first compute output, and an output residue code generator configured to receive the first compute output from the first compute kernel, and reduce the first compute output by the modulus, a kernel processor having:

a second compute kernel configured to receive the one or more operands from the data input, and apply the arithmetic compute logic to the received one or more operands to produce the kernel compute output, and a kernel-unit modulus output residue code generator configured to receive the kernel compute output, and reduce the kernel compute output by the modulus, and a detector connected to the modulus processor and the kernel processor, the detector configured to:

receive, from the modulus processor, the reduced first compute output, receive, from the kernel processor, the reduced kernel compute output, and detect a single event effect based on a comparison of the reduced first compute output and the reduced kernel compute output.

18. The system of claim 17, wherein the plurality of semiconductor devices enables, delays, or disables one or more functions based on the single event effect detected by the plurality of sensors.

19. The system of claim 17, wherein each of the plurality of sensors is further configured to detect a one-bit fault caused by the single event effect, and correct the one-bit fault by performing a double pairwise comparison for determining a position of the one-bit fault.

20. The system of claim 17, wherein each of the plurality of sensors is further configured to detect a two-bit fault caused by the single event effect, and correct the two-bit fault by performing a triple pairwise comparison for determining a position of the two-bit fault.

* * * * *